United States Patent [19]
Rao et al.

[11] Patent Number: 6,004,374
[45] Date of Patent: Dec. 21, 1999

[54] CARBONACEOUS ADSORBENT MEMBRANES FOR GAS DEHYDRATION

[75] Inventors: Madhukar Bhaskara Rao, Allentown; Shivaji Sircar, Wescosville; Timothy Christopher Golden, Allentown, all of Pa.

[73] Assignee: Air Products and Chemicals, Inc., Allentown, Pa.

[21] Appl. No.: 08/948,676

[22] Filed: Oct. 10, 1997

[51] Int. Cl.[6] ............................. B01D 53/22; B01D 53/26
[52] U.S. Cl. ................................. 95/52; 96/4; 55/DIG. 5
[58] Field of Search ................................ 55/524, DIG. 5; 95/45, 52; 96/4, 12, 13

[56] References Cited

U.S. PATENT DOCUMENTS

| | | | |
|---|---|---|---|
| 4,497,640 | 2/1985 | Fournie et al. | 55/16 |
| 4,583,996 | 4/1986 | Sakata et al. | 95/52 X |
| 4,640,901 | 2/1987 | Lee et al. | 96/12 X |
| 4,685,940 | 8/1987 | Soffer et al. | 55/158 |
| 4,692,354 | 9/1987 | Asaeda et al. | 427/244 |
| 4,702,749 | 10/1987 | Sircar et al. | 55/33 |
| 4,783,201 | 11/1988 | Rice et al. | 55/16 |
| 4,885,086 | 12/1989 | Miura | 210/321.8 |
| 4,919,860 | 4/1990 | Schindler | 264/29 |
| 4,931,070 | 6/1990 | Prasad | 55/16 |
| 4,952,219 | 8/1990 | DiMartino, Sr. | 55/16 |
| 4,981,498 | 1/1991 | Bikson et al. | 55/16 |
| 5,067,971 | 11/1991 | Bikson et al. | 55/16 |
| 5,089,135 | 2/1992 | Yoneyama et al. | 210/500.23 |
| 5,104,425 | 4/1992 | Rao et al. | 55/16 |
| 5,116,396 | 5/1992 | Prasad et al. | 95/52 X |
| 5,226,932 | 7/1993 | Prasad | 95/45 |
| 5,240,472 | 8/1993 | Sircar | 95/52 |
| 5,306,476 | 4/1994 | Jalan et al. | 95/45 X |
| 5,332,424 | 7/1994 | Rao et al. | 95/47 |
| 5,354,547 | 10/1994 | Rao et al. | 423/650 |
| 5,431,864 | 7/1995 | Rao et al. | 264/29 |
| 5,435,836 | 7/1995 | Anand et al. | 95/45 |
| 5,447,559 | 9/1995 | Rao et al. | 96/4 |
| 5,507,856 | 4/1996 | Rao et al. | 95/50 |
| 5,507,860 | 4/1996 | Rao et al. | 96/12 |
| 5,620,500 | 4/1997 | Fukui et al. | 95/52 |
| 5,649,996 | 7/1997 | Soffer et al. | 95/45 X |

OTHER PUBLICATIONS

Koresh, J. E., et al., Mechanism of Permeation through Molecular–sieve Carbon Membrane, *J. Chem. Soc.*, Faraday Trans. 1, 1986, 82, 2057.

Koresh, J. E., et al., "The Carbon Molecular Sieve Membranes, General Properties and the Permeability of CH4/H2 Mixture", *Separation Science and Technology*, 22(2&3), 973–982, 1987.

Shusen, W., et al., "Asymmetric Molecular Sieve Carbon Membranes", *Journal of Membrane Science* 109 (1996) 267–270.

Geiszler V. C., et al., "Effects of polyimide Pyrolysis Conditions on Carbon Molecular Sieve Membrane Properties", *Ind. Eng. Chem. Res. 1996*, 35, 2999–3003.

Kita, H. et al., "Carbon Molecular Sieve Membrane Prepared from Phenolic Resin", Chemistry Letters 1997, 179–180.

Suda, H., et al., "Gas Permeation through Micropores of Carbon Molecular Sieve Membranes Derived from Katon Polyimide", *J. Phys. Chem. B*, 1997, 101, 3988–3994.

Rao, M.B., et al., "Nanoporous Carbon Membranes for Separation of Gas Mixtures by Selective Surface Flow", *Journal of Membrane Science*, 85 (1993) 253–264.

Ohya, H., et al., "Characteristics of a Zirconia Composite Membrane Fabricated by a Laser Firing Method", *Journal of Membrane Science 110 (1996)* 249–252.

*Primary Examiner*—Robert Spitzer
*Attorney, Agent, or Firm*—John M. Fernbacher

[57] ABSTRACT

A carbonaceous adsorbent membrane is prepared by contacting a hydrophobic carbonaceous adsorbent membrane with an aqueous solution of one or more oxidizing acids and one or more metals selected from the group consisting of copper (+2), chromium (+3), and nickel (+2). The treated membrane is rinsed and dried to yield a hydrophilic carbonaceous adsorbent membrane which is useful for removing water from water-containing gas mixtures.

25 Claims, 3 Drawing Sheets

CARBONACEOUS ADSORBENT MEMBRANES FOR GAS DEHYDRATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The removal of water from gas streams is important in many industrial processes in which the presence of water has an adverse effect on downstream process steps. Common examples include the dehydration of compressed air used for instrumentation systems and the pretreatment of compressed air feed to cryogenic air separation systems to remove water in combination with other contaminants. Pressure swing and temperature swing adsorption processes are well-known and widely-used for gas dehydration. Membrane-based processes which utilize water-selective permeable membranes are also known in the art and are used for gas dehydration, either alone or in combination with adsorption processes.

Most membranes used for gas dehydration are hydrophilic polymeric membranes which preferentially permeate water. Representative art describing the use of polymeric dehydration membranes includes U.S. Pat. Nos. 4,497,640, 4,783, 201, 4,885,086, 4,981,498, and 5,067,971. Alternatively, inorganic ceramic or silica/alumina membranes can be used for gas dehydration as described for example in U.S. Pat. Nos. 4,692,354 and 5,240,472, and in an article entitled "Characteristics of a Zirconia Composite Membrane Fabricated by a Laser Firing Method" by H. Ohya et al in *J. Membr. Sci.* (1996), 110(2), 2499–52.

Porous carbonaceous adsorbent membranes can be used to separate gas mixtures by selective permeation. Separation occurs in these membranes by several mechanisms depending upon the sizes of the membrane pores relative to the sizes of the molecules in the gas mixtures. When the membrane pore diameters are generally larger than the diameters of some molecules but smaller than the diameters of other molecules in a gas mixture, separation is effected by size exclusion or molecular sieving in which smaller molecules permeate while larger molecules do not permeate. Such membranes are described in U.S. Pat. No. 4,685,940 and in representative articles entitled "Mechanism of Permeation through Molecular-sieve Carbon Membrane" by J. E. Koresh et al in *J. Chem. Soc., Faraday Trans.* 1, 1986, 82, 2057–2063, "The Carbon Molecular Sieve Membranes: General Properties and the Permeability of $CH_4/H_2$ Mixtures" by J. E. Koresh et al in *Separation Science and Technology*, 22(2&3), 973–982 (1987), "Asymmetric Molecular Sieve Carbon Membranes" by W. Shusen et al in *J. Membrane Science* 109 (1966) 267–270, and "Effects of Polyimide Pyrolysis Conditions on Carbon Molecular Sieve Properties" by V. C. Geiszler et al in *Ind. Eng. Chem. Res.* 1996, 35, 2999–3003.

When the pore diameters of a carbonaceous adsorbent membrane are generally larger than the diameters of all molecular species in a gas mixture but less than about 3 to 4 times the diameter the largest molecules in the gas mixture, surface diffusion or selective surface flow occurs in which more strongly adsorbed molecules selectively permeate the membrane by a predominantly surface diffusion mechanism and less strongly adsorbed molecules are selectively rejected in the nonpermeate gas. The preparation and use of such membranes are described in U.S. Pat. Nos. 5,104,425, 5,431,864, and 5,507,860, and in an article entitled "Nanoporous Carbon Membranes for Separation of Gas Mixtures by Selective Surface Flow" by M. B. Rao et al in *J. Membrane Science*, 85 (1993) 253–264. Carbon membranes which exhibit molecular sieving or surface diffusion are described in articles entitled "Carbon Molecular Sieve Membrane Prepared from Phenolic Resin" by H. Kita et al in *Chemistry Letters* 1997, pp. 179–180 and "Gas Permeation through Micropores of Carbon Molecular Sieve Membranes Derived from Kapton Polyimide" by H. Suda et al in *J. Phys. Chem B* 1997, 101, 3988–3994.

When the pore diameters of a carbonaceous adsorbent membrane are significantly larger than the diameter of the largest molecules in a gas mixture, wherein the pore diameters typically are greater than about 50–100 Angstroms, permeation occurs predominantly by Knudsen diffusion and separation is effected by differences in the mean free paths of the molecules in the mixture. Components with lower molecular weights permeate preferentially over components with higher molecular weights. Carbonaceous adsorbent membranes of this type are described in U.S. Pat. Nos. 4,919,860 and 5,089,135.

Carbonaceous adsorbent membranes are desirable because the more strongly adsorbed components in a gas mixture permeate the membrane with high selectivity over the less strongly adsorbed components. In addition, these membranes can operate with relatively low feed gas pressures and exhibit high gas flux compared to polymeric membranes. Carbonaceous adsorbent membranes have generally hydrophobic surface characteristics when initially prepared by the usual pyrolysis method, and do not have high permeation selectivity for water. For this reason, carbonaceous adsorbent membranes have not been used for gas dehydration. Because of the advantages described above, carbonaceous adsorbent membranes which preferentially permeate water would be desirable in many gas dehydration applications. The invention disclosed below and defined in the claims which follow pertains to a carbonaceous adsorbent membrane which preferentially removes water from water-containing gas mixtures.

BRIEF SUMMARY OF THE INVENTION

The invention is a method of making a carbonaceous adsorbent membrane for removing water from a water-containing gas mixture which comprises contacting a hydrophobic carbonaceous adsorbent membrane with an aqueous solution of one or more oxidizing acids and one or more metals selected from the group consisting of copper (+2), chromium (+3), and nickel (+2), removing the resulting treated carbonaceous adsorbent membrane from contact with the solution, washing the treated carbonaceous adsorbent membrane to remove residual solution therefrom, and drying the resulting washed treated carbonaceous adsorbent membrane to yield a hydrophilic carbonaceous adsorbent membrane. Preferably, the contacting is carried out in the temperature range of about 25 to about 100° C. for a duration of about 15 seconds to about 30 minutes.

The one or more metals in solution can be in the form of one or more soluble salts selected from the group consisting of acetate, formate, oxalate, and nitrate. The total concentration of the one or more metals in the solution can be in the range of about 0.1 to about 1.0 molar. Nitric or perchloric acid, or mixtures of these acids, can be used as the oxidizing acids, and the total concentration of these acids in the solution can be in the range of about 20 to about 60 vol %. Other oxidizing acids may be used if desired.

The hydrophobic carbonaceous adsorbent membrane can be made by a method which comprises (a) coating a surface of a porous substrate with a layer of an organic precursor material;

(b) heating the resulting coated porous substrate in an inert atmosphere to a selected temperature and holding the coated porous substrate at that temperature for a time sufficient to convert the organic precursor material into a layer of microporous hydrophobic adsorbent carbonaceous material; and (c) cooling the resulting hydrophobic carbonaceous adsorbent membrane to ambient temperature.

Optionally, following step (b) the resulting composite hydrophobic carbonaceous adsorbent membrane can be cooled to a temperature below the selected temperature and contacted with one or more oxidizing gases selected from the group consisting of air, oxygen, carbon oxides, nitrogen oxides, and water.

The organic precursor may comprise one or more polymeric materials selected from the group consisting of polyvinylidene chloride, polyvinyl chloride, polyacrylonitrile, styrene-divinyl benzene copolymer, and phenolic resin (e.g. phenol formaldehydes). The porous substrate may comprise one or more materials selected from the group consisting of ceramic, carbonaceous, metallic, and polymeric materials.

The invention also is a carbonaceous adsorbent membrane made by the method which comprises contacting a hydrophobic carbonaceous adsorbent membrane with an aqueous solution of one or more oxidizing acids and one or more metals selected from the group consisting of copper (+2), chromium (+3), and nickel (+2), removing the resulting treated carbonaceous adsorbent membrane from contact with the solution, washing the treated carbonaceous adsorbent membrane to remove residual solution therefrom, and drying the resulting washed treated carbonaceous adsorbent membrane. The final treated membrane will selectively permeate water from a water-containing gas mixture.

The contacting with the aqueous solution can be carried out in the temperature range of about 25 to about 100° C. for a duration of about 15 seconds to about 30 minutes. The one or more metals in the solution are in the form of one or more soluble salts, preferably selected from the group consisting of acetate, formate, oxalate, and nitrate. The total concentration of the one or more metals in the aqueous solution preferably is in the range of about 0.1 to about 1.0 molar.

The aqueous solution comprises one or more acids preferably selected from the group consisting of nitric and perchloric acids, and the total concentration of these acids in the aqueous solution can be in the range of about 20 to about 60 vol %.

The organic precursor may be selected from one or more polymeric materials such as polyvinylidene chloride, polyvinyl chloride, polyacrylonitrile, styrene-divinyl benzene copolymer, and phenolic resins (e.g. phenol formaldehydes). The porous substrate can be made of one or more ceramic, carbonaceous, metallic, and polymeric materials.

The invention includes a method of dehydrating a mixed gas stream containing water and one or more additional components which comprises (a) contacting the gas stream with a first surface of a hydrophilic carbonaceous adsorbent membrane wherein water is selectively adsorbed and permeates through the membrane as an adsorbed fluid phase to a second surface of the membrane;

(b) withdrawing a water-depleted gas stream from contact with the first surface of the hydrophilic carbonaceous adsorbent membrane; and (c) withdrawing a water-enriched gas permeate stream from the second surface of the hydrophilic carbonaceous adsorbent membrane.

Optionally, a sweep gas is passed across the second surface of the hydrophilic carbonaceous adsorbent membrane to increase the permeation of water through the membrane. The major components in the mixed gas stream may include one or more of the components oxygen, nitrogen, methane, carbon oxides, ethane, ethylene, propane, and propylene.

DETAILED DESCRIPTION OF THE INVENTION

Figure 1:
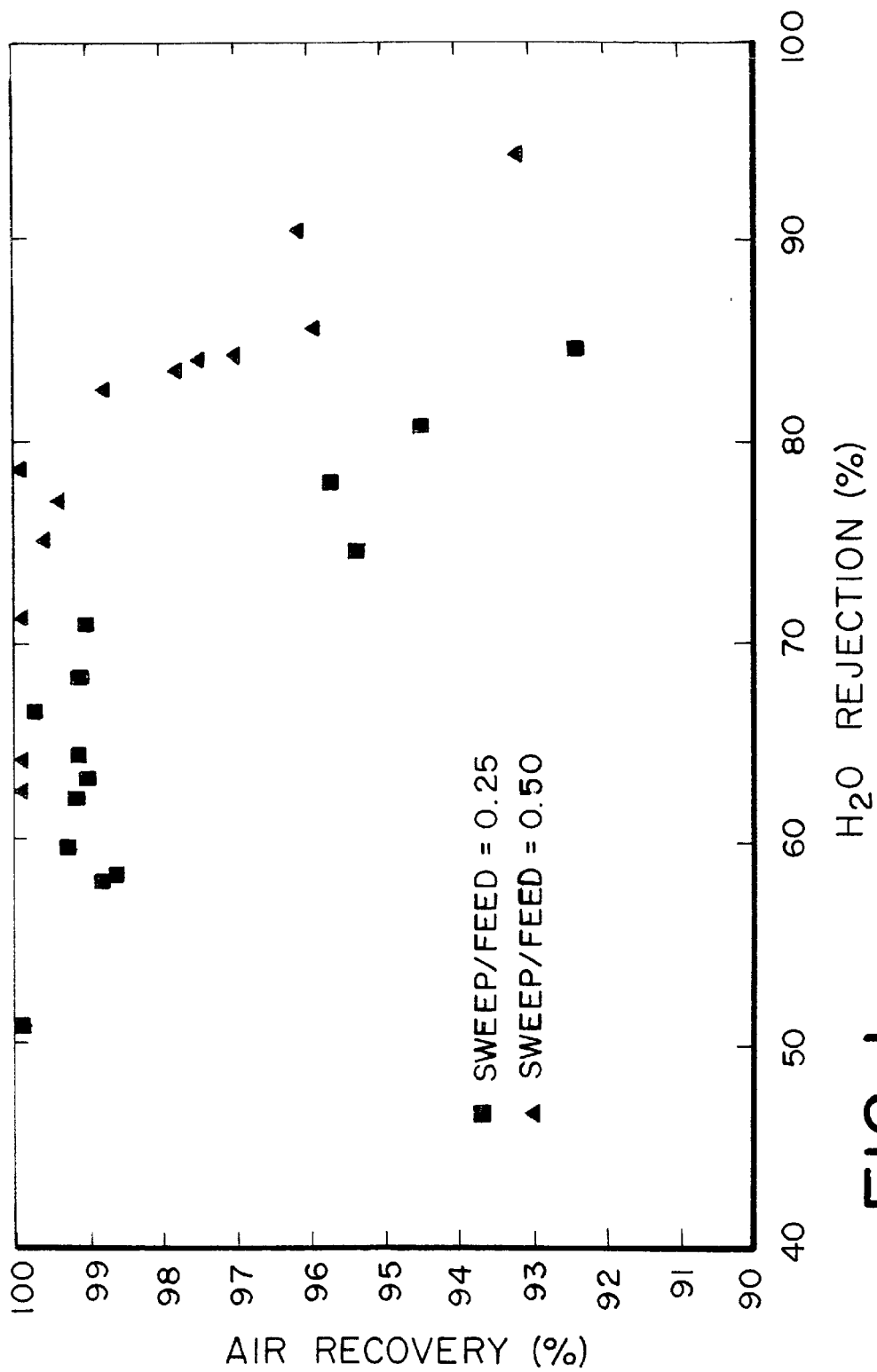
FIG. 1 is a plot of air recovery vs. water rejection for a four-tube module containing tubular hydrophilic carbonaceous adsorbent membranes of the present invention.

Carbonaceous adsorbent membranes are desirable because they selectively permeate the more strongly adsorbed components in a gas mixture with high permeation selectivity over the less strongly adsorbed components. In addition, these membranes can operate with relatively low feed gas pressures and exhibit high gas flux compared to polymeric membranes. However, carbonaceous adsorbent membranes have generally hydrophobic surface characteristics when initially prepared by the usual pyrolysis method, and have low permeation selectivity for water. For this reason, carbonaceous adsorbent membranes have not been used for gas dehydration.

In the present invention, the surface properties of hydrophobic carbonaceous adsorbent membranes are modified by aqueous oxidation methods to yield hydrophilic carbonaceous adsorbent membranes which preferentially permeate water from water-containing gas mixtures. The hydrophobic carbonaceous adsorbent membrane is defined herein as a carbonaceous adsorbent membrane made by the pyrolysis of an organic precursor to form porous adsorptive carbonaceous material as a membrane layer on a porous support. Pyrolysis is carried out in an inert atmosphere, and the hydrophobic carbonaceous adsorbent membrane therefore has an essentially unoxidized surface. The hydrophobic carbonaceous adsorbent membrane has a much lower permeation selectivity for water than for other components in water-containing gas mixtures. The hydrophilic carbonaceous adsorbent membrane as defined herein is a modified hydrophobic carbonaceous adsorbent membrane which has been treated by the oxidative process of the present invention to yield a significant increase in the selectivity of water permeation from water-containing gas mixtures.

It is known in the art that the hydrophobic surfaces of ordinary granular activated carbon adsorbents can be modified by appropriate oxidation procedures to change the water adsorption characteristics of the adsorbents. Such modified activated carbon adsorbents exhibit favorable adsorption isotherms and can be used in pressure swing and/or temperature swing adsorption processes for gas dehydration. Representative methods for such treatment of granular activated carbon are described for example in U.S. Pat. No. 4,702,749.

In the present invention, hydrophobic carbonaceous adsorbent membranes are oxidized under controlled conditions in acidic oxidizing solutions containing selected metal salts to yield hydrophilic carbonaceous adsorbent membranes. As described below, the oxidation treatment must be carefully controlled such that the adsorbent surface properties are sufficiently modified without adversely changing the pore size characteristics of the membranes. Such treatment differs significantly from known treatment methods to impart hydrophilic properties to granular activated carbon adsorbents.

Hydrophobic carbonaceous adsorbent membranes can be prepared by known methods as described in the earlier-cited U.S. Pat. Nos. 5,104,425, 5,431,864, and 5,507,860, all of which are incorporated herein by reference. Representative methods of making carbonaceous adsorbent membranes are described below.

One type of hydrophobic carbonaceous adsorbent membrane for modification by the present invention is made by coating a porous graphite substrate with a thin film of an aqueous suspension (latex) containing a polyvinylidine chloride-acrylate terpolymer, drying the coated substrate at 150° C. for five minutes, heating the substrate in nitrogen to 1000° C. at a rate of 1° C. per minute, holding at temperature for three hours, and cooling to ambient temperature at 10° C. per minute. The polymer coating is carbonized during the heating step thereby forming an ultrathin layer of microporous carbon on the substrate. Additional coating and carbonization steps can be used if needed to improve the properties of the adsorbent carbon layer.

In order to enhance the properties of an adsorbent membrane made by this method, further treatment can be carried out by heating the membrane to a temperature between 200 and 900° C., oxidizing the membrane at that temperature in an oxidizing atmosphere for 0.25 to 12 hours, and cooling the oxidized membrane. The heating, oxidizing, and cooling steps can be repeated one or more times, and the temperature after cooling between successive oxidation steps can be ambient or above. The oxidizing atmosphere can be selected from air, oxygen, carbon oxides, nitrogen oxides, steam, and mixtures thereof.

The adsorbent membrane and substrate can be fabricated in a tubular configuration in which the microporous adsorbent material is deposited on the inner and/or outer surface of a tubular porous substrate, and the resulting tubular adsorbent membrane elements can be assembled in a shell-and-tube configuration in an appropriate pressure vessel to form a membrane module. A plurality of membrane modules in parallel and/or series can be utilized when gas feed rates and separation requirements exceed the capability of a single module of practical size. Alternatively, the adsorbent membrane and support can be fabricated in a flat sheet configuration which can be assembled into a module using a plate-and-frame arrangement. Alternatively, the adsorbent membrane and support can be fabricated in a monolith configuration to provide a high membrane surface area per unit volume of membrane module. The monolith can be a porous ceramic, porous glass, porous metal, or a porous carbon material. It is also possible to use a hollow fiber configuration in which the adsorbent membrane is supported by fine hollow fibers of the substrate material.

The hydrophobic carbonaceous adsorbent membranes described above can be fabricated specifically for modification by the present invention to yield hydrophilic carbonaceous adsorbent membranes capable of removing water from water-containing gas mixtures. The pore diameters of the membranes relative to the molecular diameters of the components in the water-containing gas mixture to be separated should be selected such that (1) the pore diameters are generally larger than the molecular diameters of all species in the gas mixture and (2) the pore diameters are generally less than about 3 to 4 times the diameter of the largest molecule in the gas mixture. When the molecular diameters and membrane pore sizes are related according to (1) and (2) as described, adsorption and surface diffusion or selective surface flow will occur preferentially in which more strongly adsorbed molecules permeate the membrane by a predominantly surface diffusion mechanism and less strongly adsorbed molecules are selectively rejected in the nonpermeate gas. In a gaseous mixture of water and air, for example, water preferentially adsorbs and permeates the membrane while oxygen and nitrogen are selectively rejected in the nonpermeate gas. Since the molecular diameter of the largest component in this gas mixture (nitrogen) is 3.64 Angstroms, the membrane should have a majority of pore diameters smaller than about 15 Angstroms and larger than about 4 Angstroms.

Hydrophobic carbonaceous adsorbent membranes for modification by the present invention can be made by any method which produces membranes which after aqueous oxidation yield pore diameters required for specific gas mixture separations as described above. Preferred methods for making these membranes are described above and in earlier-cited U.S. Pat. Nos. 5,104,425, 5,431,864, and 5,507,860. Alternatively, any other methods for making hydrophobic carbonaceous adsorbent membranes can be used, including the various methods for the pyrolysis of polymeric materials described in the other earlier-cited references. When carried out at the proper conditions, such methods can yield satisfactory hydrophobic carbonaceous adsorbent membranes for modification by the present invention.

The method of the present invention modifies the generally hydrophobic surface of a carbonaceous adsorbent membrane by selectively oxidizing the surface while maintaining the preferred pore size characteristics described above. The preferred method is to contact the hydrophobic carbonaceous adsorbent membrane with an aqueous solution containing an oxidizing acid and one or more metals selected from the group consisting of copper, chromium, nickel, and mixtures thereof. The resulting treated carbonaceous adsorbent membrane is washed to remove residual solution therefrom, and the resulting washed treated carbonaceous adsorbent membrane is dried to yield a hydrophilic carbonaceous adsorbent membrane. The aqueous oxidation step is carried out in the temperature range of about 25 to about 100° C. for a duration of about 15 seconds to about 30 minutes. Various combinations of time and temperature can be used to control the final membrane properties as illustrated in the following Examples.

The metals preferably are in the form of one or more soluble salts selected from the group consisting of acetate, formate, oxalate, and nitrate, and the total concentration of metals in the solution should be in the range of about 0.1 to about 1.0 molar. The acid used in the oxidizing solution can be nitric, perchloric, or any strongly oxidizing acid which imparts oxygen functional groups to the carbon membrane surface. Mixtures of acids can be used if desired. The acid concentration in the aqueous solution should be in the range of about 20 to about 60 vol %.

The following Examples illustrate the preparation and use of the hydrophilic carbonaceous adsorbent membranes of the present invention.

EXAMPLE 1

A flat sheet hydrophobic carbonaceous adsorbent membrane was prepared by coating the surface of a porous graphite sheet 4.5 inches in diameter and 250 microns thick having a pore diameter of about 1 micron with an aqueous polymer dispersion (latex) of 55 wt % polyvinylidine chloride. The sheet was spun to remove excess latex and the coated sheet was air-dried for 4 hours. The dried coated sheet was heated under a nitrogen atmosphere at a heating rate of 1° C./minute to a temperature of 600° C. and held at that temperature for 3 hours to pyrolyze the latex material. The resulting membrane was cooled under nitrogen to 350° C. and exposed to zero-grade air for 1 hour followed by cooling to room temperature under nitrogen. These steps were repeated twice to produce a membrane with three layers of porous activated carbon.

EXAMPLE 2

The membrane prepared in Example 1 was inserted into a standard countercurrent membrane test module. This module consists of a high-pressure and a low pressure side with the membrane between, and appropriate gas-tight seals to isolate the high- and low-pressure sides. Each side has inlet and outlet ports for gas feed and withdrawal. Water permeation across the membrane was measured at ambient temperature by passing a water-containing air stream through the high pressure side of the test module at 3.9 atm and passing a sweep stream of dry nitrogen at 1.4 atm countercurrently through the low pressure (permeate) side of the test module (all pressures reported herein are absolute pressures unless otherwise indicated). The water-containing air stream was prepared by bubbling cylinder air through a water bath maintained at a temperature below ambient and the water content of this stream was measured by a chilled mirror hygrometer. The effluent streams from the high pressure and low pressure sides of the test module were monitored by measuring the flow rates, oxygen concentrations, and dew points using bubble flowmeters, a Servomex oxygen analyzer, and chilled mirror hygrometers, respectively. Overall and component mass balances were computed and the permeance of each component in the gas mixture was determined based on the logarithmic-mean partial pressure driving force. Pure helium permeance across the membrane was measured using a standard constant-volume permeation apparatus.

The membrane was removed from the test cell and an aqueous solution of Cu(+2) acetate at 0.4 molar was prepared and mixed in a 1:1 volume ratio with fuming nitric acid. The solution was heated to 90° C. and the membrane was immersed in the solution for 15 seconds. After immersion the treated membrane was withdrawn, washed with at least one liter of distilled water, and dried at 120° C. under nitrogen overnight. Permeation tests were carried out on the treated membrane using the procedures described above for the original untreated membrane.

After these permeation tests, the membrane was removed from the test cell and acid treated again using the method described above but with an immersion time of 30 seconds. This further-treated membrane therefore had a total solution oxidation time of 45 seconds. The further-treated membrane was inserted into the test module and the permeation tests described above were repeated.

The results of the permeation testing are given in Table 1. The original untreated membrane shows a relatively low permeation selectivity of 2.1 for water over oxygen. The pure He permeance decreased from $35.9 \times 10^{-5}$ std cc/[(cm$^2$)(sec)(cm Hg)] for the original untreated membrane to $11.9 \times 10^{-5}$ std cc/[(cm$^2$)(sec)(cm Hg)] for the membrane receiving a 15 second acid oxidation treatment, indicating that the pore size of the membrane was reduced. The water permeance also was reduced by a factor of about 2 but the oxygen permeance from wet air was reduced by an order of magnitude. The selectivity for water over oxygen (defined as the water permeance divided by the oxygen permeance) was increased to 9.6 by the oxidative treatment. These data indicate that the oxidized membrane selectively adsorbs water which significantly restricts oxygen permeation, and this is proof of the selective surface flow mechanism in which water adsorbs and permeates in the adsorbed surface phase. Further oxidation of the membrane for an additional 30 seconds using the same oxidizing medium resulted in a dramatic reduction in water/oxygen selectivity. The additionally oxidized membrane showed a dramatic increase in the pure He permeance from 11.9 to $71.6 \times 10^5$ std cc/[(cm$^2$)(sec)(cm Hg)] indicating that the membrane pore size was enlarged and was even larger than that of the original untreated membrane. The water and oxygen permeation across the membrane which was acid-treated for an additional 30 seconds was significantly higher than the membrane treated only for 15 seconds, but the overall water/oxygen selectivity is comparable to the original untreated membrane. These results indicate that the additional 30 second acid treatment was so severe as to increase the pore size substantially. The oxidized surface showed enhanced water permeation, but the larger pore size did not allow the adsorbed water to restrict oxygen permeation and hence the water/oxygen selectivity was reduced.

TABLE 1

Water and Oxygen Permeation from Wet Air on Flat Sheet Carbon Membrane Oxidized with Nitric Acid/Cu acetate Mixture at 90° C.

| Acid Oxidation Treatment | Pure He Permeance | $O_2$ Permeance from Wet Air | Water Permeance from Wet Air | Selectivity $H_2O/O_2$ |
|---|---|---|---|---|
| None* | 35.9 | 34.0 | 72.8 | 2.1 |
| 15-second treatment with acid solution | 11.9 | 3.7 | 35.6 | 9.6 |
| Additional 30-second treatment with acid solution | 71.6 | 45.6 | 88.4 | 1.9 |

Feed pressure = 3.9 atm,
Permeate pressure = 1.4 atm
Mole fraction of water in feed = 0.003
Permeance units are $10^{-5}$ std cc/[(cm$^2$)(sec)(cm Hg)]
*Feed pressure = 3.3 atm

EXAMPLE 3

A second membrane was prepared according to Example 1 above and the permeation properties were determined as above. The membrane then was oxidized in the following manner. An aqueous solution of Cu(+2) acetate at 0.4 molar was prepared and mixed in a 1:1 volume ratio with fuming nitric acid, and this oxidizing solution was diluted to 50% concentration by adding an equal volume of distilled water. The solution was heated to 90° C. and the membrane was immersed in the solution for 15 seconds, was washed with at least 1 liter of distilled water, and was dried under $N_2$ at 120° C. overnight. The membrane then was treated two more times by the same method described above for a total of three oxidizing treatments with a total oxidation time of 45 seconds.

The permeation characteristics of this membrane before and after acid oxidation are shown in Table 2. The He permeance of the original untreated membrane was $15.1 \times 10^5$ std cc/[(cm$^2$)(sec)(cm Hg)], which is lower than the original untreated membrane of Example 2 (see Table 1 above). The water and oxygen permeances from wet air were also lower than the untreated membrane of Example 2, but the water/oxygen selectivity was comparable. These data indicate that the original untreated membrane had a smaller pore size and only weakly adsorbed water compared with the original untreated membrane of Example 2. The permeance data after oxidation treatment indicates that oxidation affects the membrane by reducing the pore size as demonstrated by the lower He permeance. The water permeation is only slightly lowered whereas the oxygen permeance is lowered by a factor of 20. The net result is a water to oxygen selectivity of almost 50, which is due to preferential adsorption of water on the oxidized membrane which blocks permeation of oxygen. The use of a diluted acid solution in Example 3 results in a slower rate of oxidation than in Example 2 which used a stronger oxidizing solution, and indicates that the degree of oxidation can be controlled. This demonstrates that controlling the oxidation rate is critical in making high selectivity membranes.

TABLE 2

Water and Oxygen Permeation from Flat Sheet Carbon Membrane Oxidized with Diluted Nitric Acid/Cu Acetate Mixture at 90° C.

| Acid Oxidation Treatment | Pure He Permeance | O$_2$ Permeance from Wet Air | Water Permeance from Wet Air | Selectivity H$_2$O/O$_2$ |
|---|---|---|---|---|
| None (as prepared) | 15.1 | 15.8 | 45.4 | 2.9 |
| 45 seconds of oxidation with acid solution | 2.5 | 0.76 | 37.6 | 49.5 |

Feed Pressure = 2.1 atm,
Permeate pressure = 1.3 atm
Mole fraction of water in feed = 0.00934
Permeance units are $10^{-5}$ std cc/[(cm$^2$)(sec)(cm Hg)]

EXAMPLE 4

An alumina tube with a 9 mm outside diameter, a 6 mm inside diameter, and an average pore diameter of 0.3 micrometer was coated on the bore side with an aqueous latex of polyvinylidine chloride polymer containing 3.4 wt % solids. After 1 minute of contact, the latex was drained from the tube and it was allowed to air dry. The coated tube was pyrolyzed at 600° C. (heating rate 15° C./min) under nitrogen and held at that temperature for 3 hrs. The membrane was then cooled to 350° C. and exposed to zero-grade air for 30 minutes prior to cooling in nitrogen to room temperature (designated as Membrane A). Another tubular membrane was prepared by the same procedure (designated as Membrane B). The permeation properties of the membranes were determined using the method described above in Examples 2 and 3.

An aqueous solution of Cu+2 acetate at 0.4 molar was prepared and mixed in a 1:1 volume ratio of fuming nitric acid. This solution was heated to 90° C., poured into the bore of the tubular carbon membranes prepared above and held in contact with the membranes for 15 sec. The solution was then drained and the tubes were washed with copious amounts (at least 1 liter) of distilled water and dried at 120° C. under dry nitrogen overnight. The permeation properties of the treated tubes were determined as above.

Table 3 shows the permeation characteristics of membranes A and B before and after oxidation treatment. Before treatment, the membranes had a pure helium permeance of about $65 \times 10^{-5}$ std cc/[(cm$^2$)(sec)(cm Hg)] and a pure oxygen permeance of about $50 \times 10^{-5}$ std cc/[(cm$^2$)(sec)(cm Hg)]. In the presence of water in the feed gas, the oxygen permeance was reduced to about $27 \times 10^{-5}$ std cc/[(cm$^2$)(sec)(cm Hg)] which indicates that the presence of water reduces the oxygen permeance in the unoxidized membrane. The water to oxygen permeance selectivity was about 3.

After oxidation, however, the membrane performance was significantly different. The helium permeance was reduced to about $20 \times 10^{-5}$ std cc/[(cm$^2$)(sec)(cm Hg)], indicating that oxidation treatment reduced the mean pore size of the membrane. The oxygen permeance from a dry air feed was lower than the untreated membranes. In the presence of water, the oxygen permeance was reduced to about $1.1 \times 10^{-5}$ std cc/[(cm$^2$)(sec)(cm Hg)]. The water permeance was not changed substantially by the oxidation treatment. Therefore, oxidation caused a large decrease in oxygen permeance in the presence of water, but did not affect the water permeance. The oxidized membranes exhibited a much larger water to oxygen selectivity than the untreated membranes.

TABLE 3

Summary of Properties of Untreated and Acid-treated Tubular Membranes

| Membrane | Acid Oxidation Treatment | He Permeance | Oxygen Permeance* | Permeance from Wet Air** | | Selectivity H$_2$O/O$_2$ |
|---|---|---|---|---|---|---|
| | | | | (P/I) Oxygen | (P/I) H$_2$O | |
| A | None | 70.3 | 53.2 | 28.2 | 96.1 | 3.4 |
| A | Oxidized | 18.7 | 9.5 | 1.1 | 125.8 | 114.4 |
| B | None | 62.3 | 49.3 | 26.8 | 85.5 | 3.2 |
| B | Oxidized | 20.1 | 6.4 | 1.2 | 71.9 | 59.9 |

*Permeance from dry air feed. P(high) = 1.7 atm; P(low) = 1.25 atm; N$_2$ sweep
**P(high) = 1.7 atm; P(low) = 1.25 atm; N$_2$ sweep; water mole fraction in feed = ~0.0075
(P/I) based on log mean driving force with units of $10^{-5}$ std cc/[(cm$^2$)(sec)(cm Hg)]

EXAMPLE 5

Additional tubular membranes were made according to the procedure of Example 4 using one or two coats of carbon. The permeation properties of the membranes were determined using the method described in the above Examples. The two-coat membranes were then treated with oxidizing solution as described in Example 4 and the permeation properties were again determined. The results are given in Table 4 and show the same trends as in Example 4 and Table 3, but it is seen that the two-coat membranes of Example 5 have higher water/oxygen selectivities than the single-coat membranes of Example 4. The hindrance of oxygen permeance by water is more pronounced in the two-coat membranes.

TABLE 4

Summary of Properties of Untreated and
Acid-treated Tubular Membranes With One or Two Carbon Coats

| Membrane | Acid Oxidation Treatment | He Permeance | Oxygen Permeance* | (P/I) Oxygen | (P/I) H$_2$O | Selectivity H$_2$O/O$_2$ |
|---|---|---|---|---|---|---|
| C(One coat) | None | 106.5 | | | | |
| D(Two coats) | None | 122.3 | 64 | 18.5 | 84.9 | 4.6 |
| D(Two coats) | Oxidized | 15.33 | 11.6 | 0.443 | 114 | 257.3 |
| E(One coat) | None | 115.5 | | | | |
| F(Two coats) | None | 131 | | | | |
| F(Two coats) | Oxidized | 13.9 | 12.8 | 0.364 | 51.0 | 140.1 |

*Permeance from dry air feed. P(high) = 1.7 atm; P(low) = 1.25 atm; N$_2$ sweep
**P(high) = 1.7 atm; P(low) = 1.25 atm; N$_2$ sweep; water mole fraction in feed = ~0.0075
(P/I) is based on log mean driving force with units of $10^{-5}$ std cc/[(cm$^2$)(sec)(cm Hg)]

EXAMPLE 6

A set of hydrophilic tubular carbon membranes was prepared according the method of Example 5, and four of these tubular membranes were installed in a shell and tube module. The module performance was tested using a standard permeation test 15 unit. A feed gas of dry cylinder air was passed through a stainless steel vessel containing distilled water, which was maintained at ~12° C. by immersing it refrigerated bath. The dew point of the saturated air was determined using chilled mirror hygrometers and the dew point of this air was maintained at ~14.5° C. The wet air was passed through the bore side of the membrane tubes and a countercurrent sweep of dry N$_2$ was passed on the low pressure side (shell side) of the tubes. The feed air pressure was 35 psig and the permeate pressure was 1.5 psig. High and low-pressure effluent flow rates were measured using a bubble flow meter, and water dewpoint and oxygen concentration of both streams was determined using chilled mirror hygrometers and a Servomex oxygen analyzer respectively. The typical material balance error was less than 3% overall and less than 5% for water and oxygen.

The performance of the module was characterized by the overall rejection of water and the overall recovery of oxygen. Since this membrane has no oxygen/nitrogen selectivity, the recovery of oxygen and nitrogen were equivalent and this was designated as the air recovery. FIG. 1 shows the air recovery of the membrane module versus the water rejection. Air recovery is defined as the fraction of air in the feed which leaves the module in the high pressure effluent and the water rejection is defined as the fraction of water in the feed which permeates across the membrane to the low pressure side (shell side). Each point on FIG. 1 was obtained by varying the total feed molar flowrate, and keeping the feed composition constant at about 0.45 mole % water, the feed pressure constant at 50 psia, and the sweep-to-feed flowrate ratio (S/F) constant at 0.25 and 0.50.

The results are given in FIG. 1 and indicate that a very high air recovery can be achieved with a high water rejection. For example, 99% air recovery can be achieved with a 70% water rejection. A higher S/F allows for higher water rejection at the same air recovery.

EXAMPLE 7

Figure 2:
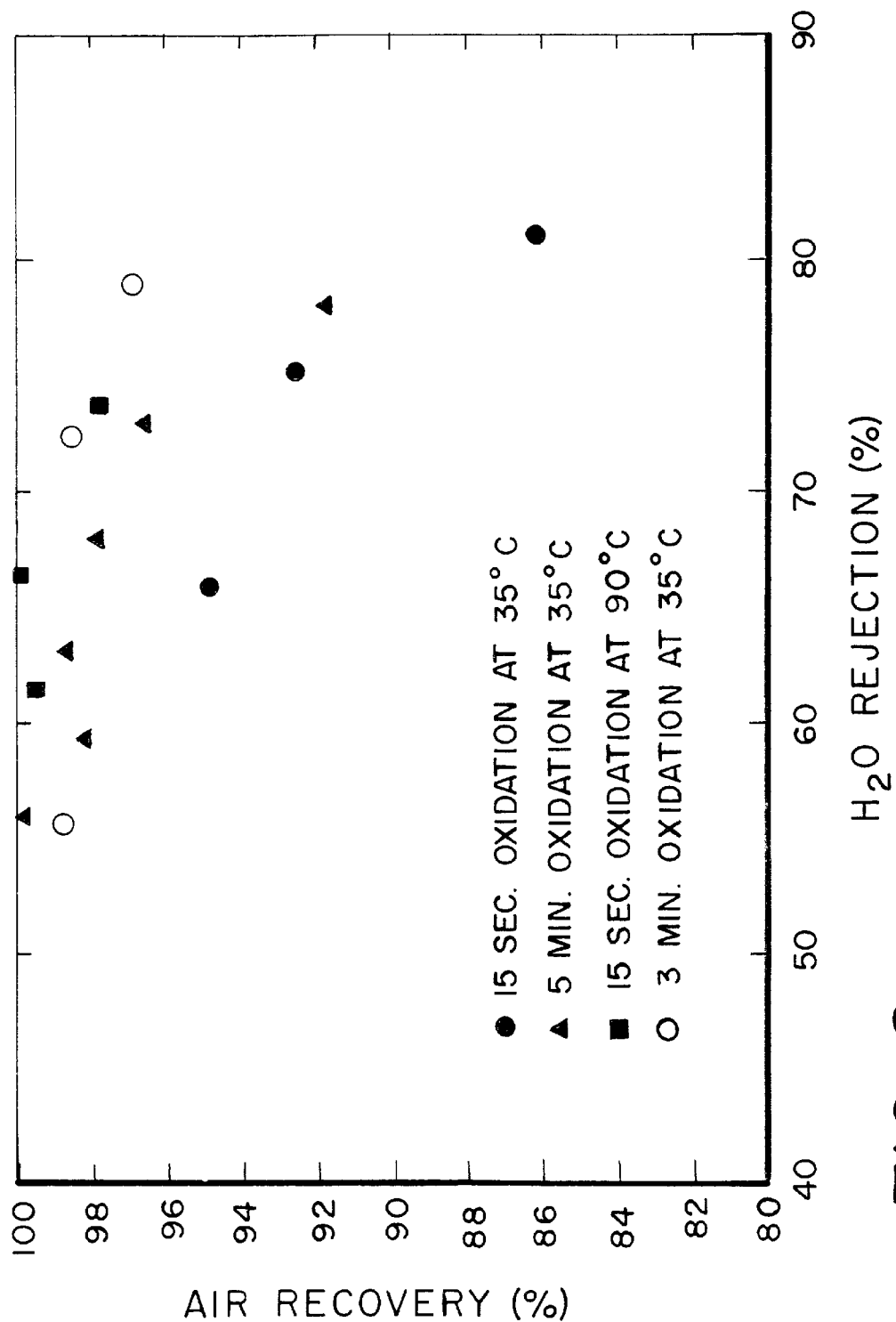
FIG. 2 is a plot of air recovery vs. water rejection for a single tubular hydrophilic carbonaceous adsorbent membrane of the present invention.

Two tubular membranes were prepared as described above but with the acid oxidation steps carried out at 35° C. for a duration of 15 seconds and 5 minutes respectively. The performance of each tube was determined as described in Example 6 and the data are plotted in FIG. 2. The performance of one of the tubes used in the 4-tube module of Example 6 is also plotted for comparison. It is seen that a 15 second oxidation time at 35° C. does not produce a membrane with good separation properties, whereas an oxidation time of 5 minutes at 35° C. produces a membrane with separation properties closer to those of the tube prepared with an oxidation time of 15 seconds at 90° C. These results indicate that a combination of oxidation time and oxidation temperature can be used to control the final properties of the membrane.

EXAMPLE 8

A set of tubular membranes was prepared according to Example 5. The tubes were oxidized at 35° C. for 3 minutes using the oxidizing solution described in Example 4, and the permeation performance of a single tube was determined by the method of Example 6. The results are plotted in FIG. 2, and the performance is seen to be comparable with the performance of tubes oxidized at 35° C. for 5 minutes and at 90° C. for 15 seconds.

Figure 3:
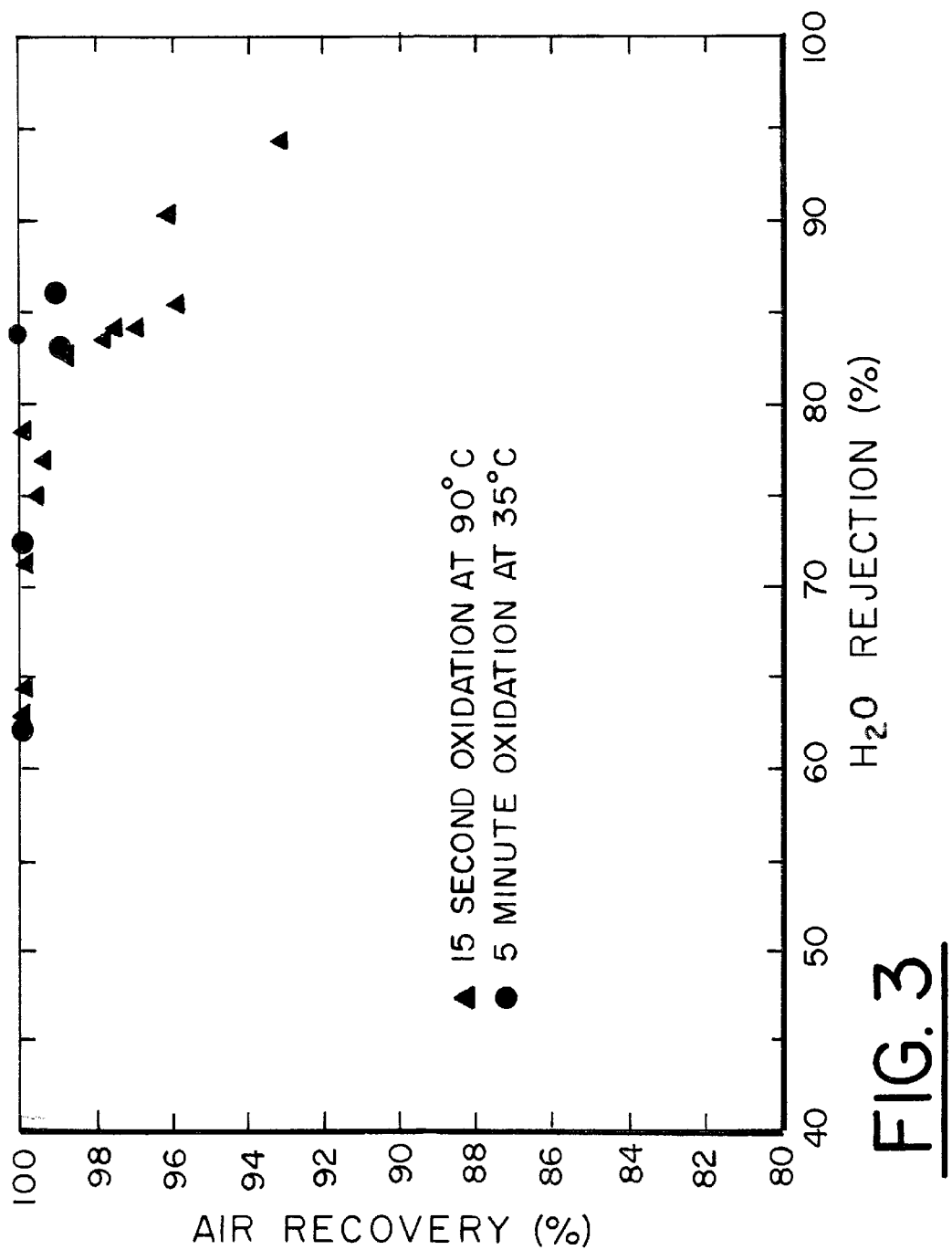
FIG. 3 is a plot of air recovery vs. water rejection for four-tube modules containing tubular hydrophilic carbonaceous adsorbent membranes of the present invention prepared under different oxidation conditions.

Four tubes were prepared as above and oxidized at 35° C. for 5 minutes, and were assembled into a module as described in Example 6. An additional module was prepared with tubes which were oxidized at 90° C. for 15 seconds. The permeation performance was determined for the two modules by the method of Example 6, and the results are plotted in FIG. 3. It is seen that the two different combinations of oxidizing time and temperature yield membranes with approximately comparable permeation performance. The combination of oxidation time and temperature thus can be used to control the permeation properties of the membranes and the resulting gas dehydration performance.

These Examples show that oxidizing acid treatment of a carbonaceous adsorbent membrane can significantly increase the water-to-oxygen selectivity of the carbon by dramatically reducing the oxygen permeance in the presence of adsorbed water, and illustrate the successful use of adsorbent membranes for selective water permeation.

Thus the present invention provides a method to modify the surface properties of hydrophobic carbonaceous adsorbent membranes by aqueous oxidation methods to yield hydrophilic carbonaceous adsorbent membranes which preferentially permeate water from water-containing gas mixtures. The aqueous oxidation is carried out at an appropriate combination of oxidation time and temperature to provide a membrane which has a high water selectivity over other components in the gas mixture while allowing high recovery of the non-permeating components. The present invention allows the use of carbon membranes rather than prior art polymeric membranes to dehydrate gas streams of industrial importance, for example such as compressed air used for instrumentation systems and the compressed air feed to cryogenic air separation systems to remove water in combination with other contaminants. The present membrane also is useful for the dehydration of reactive gases such as hydrogen chloride.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:

1. A method of dehydrating a mixed gas stream containing water and one or more additional components which comprises
   (a) contacting the gas stream with a first surface of a hydrophilic carbonaceous adsorbent membrane wherein water is selectively adsorbed and permeates through the membrane as an adsorbed fluid phase to a second surface of the membrane;
   (b) withdrawing a water-depleted gas stream from contact with the first surface of the hydrophilic carbonaceous adsorbent membrane; and
   (c) withdrawing a water-enriched gas permeate stream from the second surface of the hydrophilic carbonaceous adsorbent membrane.

2. The method of claim 1 wherein a sweep gas is passed across the second surface of the hydrophilic carbonaceous adsorbent membrane to increase the permeation of water through the membrane.

3. The method of claim 1 wherein the one or more additional components in the mixed gas stream are selected from the group consisting of oxygen, nitrogen, methane, carbon oxides, ethane, ethylene, propane, and propylene.

4. A carbonaceous adsorbent membrane made by the method which comprises contacting a hydrophobic carbonaceous adsorbent membrane with an aqueous solution of one or more oxidizing acids and one or more metals selected from the group consisting of copper (+2), chromium (+3), and nickel (+2), removing the resulting treated carbonaceous adsorbent membrane from contact with the solution, washing the treated carbonaceous adsorbent membrane to remove residual solution therefrom, and drying the resulting washed treated carbonaceous adsorbent membrane, wherein the adsorbent surface properties of the hydrophobic carbonaceous adsorbent membrane are sufficiently modified to yield a hydrophilic carbonaceous adsorbent membrane without adversely changing the pore size characteristics of the membrane.

5. The membrane of claim 4 wherein the hydrophobic carbonaceous adsorbent membrane is made by a method which comprises
   (a) coating a surface of a porous substrate with a layer of an organic precursor material;
   (b) heating the resulting coated porous substrate in an inert atmosphere to a selected temperature and holding the coated porous substrate at that temperature for a time sufficient to convert the organic precursor material into a layer of microporous hydrophobic adsorbent carbonaceous material; and
   (c) cooling the resulting hydrophobic carbonaceous adsorbent membrane to ambient temperature.

6. The membrane of claim 5 which further comprises following step (b) the additional step of cooling the resulting composite hydrophobic carbonaceous adsorbent membrane to a temperature below the selected temperature and contacting the membrane with one or more oxidizing gases selected from the group consisting of air, oxygen, carbon oxides, nitrogen oxides, and water.

7. The membrane of claim 5 wherein the contacting with the aqueous solution is carried out in the temperature range of about 25 to about 100° C.

8. The membrane of claim 5 wherein the contacting with the aqueous solution is carried out for a duration of about 15 seconds to about 30 minutes.

9. The membrane of claim 5 wherein the one or more metals are in the form of one or more soluble salts selected from the group consisting of acetate, formate, oxalate, and nitrate.

10. The membrane of claim 9 wherein the total concentration of the one or more metals in the aqueous solution is in the range of about 0.1 to about 1.0 molar.

11. The membrane of claim 5 wherein the aqueous solution comprises one or more acids selected from the group consisting of nitric and perchloric acids.

12. The membrane of claim 11 wherein the total concentration of the one or more acids in the aqueous solution is in the range of about 20 to about 60 vol %.

13. The membrane of claim 4 wherein the organic precursor comprises one or more polymeric materials selected from the group consisting of polyvinylidene chloride, polyvinyl chloride, polyacrylonitrile, styrene-divinyl benzene copolymer, and phenolic resins.

14. The membrane of claim 4 wherein the porous substrate comprises one or more materials selected from the group consisting of ceramic, carbonaceous, metallic, and polymeric materials.

15. A method of making a carbonaceous adsorbent membrane for the removal of water from a water-containing gas mixture which comprises contacting a hydrophobic carbonaceous adsorbent membrane with an aqueous solution of one or more oxidizing acids and one or more metals selected from the group consisting of copper (+2), chromium (+3), and nickel (+2), removing the resulting treated carbonaceous adsorbent membrane from contact with the solution, washing the treated carbonaceous adsorbent membrane to remove residual solution therefrom, and drying the resulting washed treated carbonaceous adsorbent membrane, wherein the adsorbent surface properties of the hydrophobic carbonaceous adsorbent membrane are sufficiently modified to yield a hydrophilic carbonaceous adsorbent membrane without adversely changing the pore size characteristics of the membrane.

16. The method of claim 15 wherein the contacting is carried out in the temperature range of about 100° C.

17. The method of claim 15 wherein the contacting is carried out for a duration of about 15 seconds to about 30 minutes.

18. The method of claim 15 wherein the one or more metals are in the form of one or more soluble salts selected from the group consisting of acetate, formate, oxalate, and nitrate.

19. The method of claim 18 wherein the total concentration of the one or more metals in the solution is in the range of about 0.1 to about 1.0 molar.

20. The method of claim 15 wherein the one or more oxidizing acids are selected from the group consisting of nitric and perchloric acids.

21. The method of claim 20 wherein the total concentration of the one or more oxidizing acids in the solution is in the range of about of about 20 to about 60 vol %.

22. The method of claim 15 wherein the hydrophobic carbonaceous adsorbent membrane is made by a method which comprises
   (a) coating a surface of a porous substrate with a layer of an organic precursor material;

(b) heating the resulting coated porous substrate in an inert atmosphere to a selected temperature and holding the coated porous substrate at that temperature for a time sufficient to convert the organic precursor material into a layer of microporous hydrophobic adsorbent carbonaceous material; and (c) cooling the resulting hydrophobic carbonaceous adsorbent membrane to ambient temperature.

23. The method of claim 22 which further comprises following step (b) the additional step of cooling the resulting composite hydrophobic carbonaceous adsorbent membrane to a temperature below the selected temperature and contacting the membrane with one or more oxidizing gases selected from the group consisting of air, oxygen, carbon oxides, nitrogen oxides, and water.

24. The method of claim 22 wherein the organic precursor comprises one or more polymeric materials selected from the group consisting of polyvinylidene chloride, polyvinyl chloride, polyacrylonitrile, styrene-divinyl benzene copolymer, and phenolic resins.

25. The method of claim 22 wherein the porous substrate comprises one or more materials selected from the group consisting of ceramic, carbonaceous, metallic, and polymeric materials.

* * * * *